United States Patent [19]

Shimada

[11] Patent Number: 5,222,121
[45] Date of Patent: Jun. 22, 1993

[54] VOICE RECOGNITION DIALING UNIT

[75] Inventor: Keiko Shimada, Tokyo, Japan

[73] Assignee: NEC Corporation, Tokyo, Japan

[21] Appl. No.: 540,436

[22] Filed: Jun. 19, 1990

[30] Foreign Application Priority Data

Jun. 19, 1989 [JP] Japan .................................. 1-157604
Jun. 27, 1989 [JP] Japan .................................. 1-166143

[51] Int. Cl.⁵ .............................................. H04M 1/27
[52] U.S. Cl. ...................................... 379/88; 379/63; 379/354; 379/355
[58] Field of Search ................... 379/88, 355, 354, 58, 379/63, 216

[56] References Cited

U.S. PATENT DOCUMENTS

| | | | |
|---|---|---|---|
| 4,644,107 | 2/1987 | Clowes et al. | 379/354 |
| 4,731,811 | 3/1988 | Dubus | 379/58 |
| 4,737,976 | 4/1988 | Borth et al. | 379/58 |
| 4,864,622 | 9/1989 | Iida et al. | 381/41 |
| 4,873,714 | 10/1989 | Ishii et al. | 379/88 |
| 4,928,302 | 5/1990 | Kaneuchi et al. | 379/88 |
| 4,945,557 | 7/1990 | Kaneuchi et al. | 379/67 |
| 5,007,081 | 4/1991 | Schmuckal et al. | 379/354 |
| 5,042,063 | 8/1991 | Sakanishi et al. | 379/88 |

FOREIGN PATENT DOCUMENTS

| | | |
|---|---|---|
| 0177405 | 4/1986 | European Pat. Off. . |
| 0311414 | 4/1989 | European Pat. Off. . |
| 3608497 | 9/1987 | Fed. Rep. of Germany . |
| 3837385 | 5/1989 | Fed. Rep. of Germany . |

OTHER PUBLICATIONS

"Spoken Nickname Recognition Telephone Dialer", IBM Tech. Disclosure Bulletin, vol. 31, No. 10, Mar. 1989, pp. 220,221.

Awad, Selim S., "Voice Technology in the Instrumentation of the Automobile," IEEE Transactions of Instrumentation and Measurement, vol 4, No. 4, Dec. 1988, pp. 586-590.

Primary Examiner—Thomas W. Brown
Attorney, Agent, or Firm—Sughrue, Mion, Zinn, Macpeak & Seas

[57] ABSTRACT

A voice recognition dialing unit of a telephone mounted on a vehicle or similar mobile body and which allows a call to be originated with ease. When the user of the telephone enters a voice command on a voice inputting section, the dialing unit originates a call automatically and thereby connects the other party to the telephone line. In a call origination procedure, the operations for call origination and the verifications are performed between the user and the unit in an interactive sequence. In a preferred embodiment, the unit has a particular call origination procedure in which, when the other party recognized by the unit is wrong as determined by the user by verification, lower-place candidates for the other party are called up in response to a particular voice command. In an alternative embodiment, the unit indicates the other party by voicing a name for verification purpose. The alternative embodiment selects and stores only the name of the other party in response to an entered voice signal and, in the event of response for verification, combines the name having been stored and response information stored beforehand to produce composite response voice.

4 Claims, 5 Drawing Sheets

VOICE RECOGNITION DIALING UNIT

BACKGROUND OF THE INVENTION

The present invention relates to a dialing unit of a telephone mounted on a mobile body or similar body and, more particularly, to a voice recognition dialing unit operable in response to voice inputted thereon.

Communication equipment of the kind using voice recognition technologies are under development and include a vehicle-mounted telephone having a voice recognition dialing unit. It is preferable with the voice recognition dialing unit that from the safety standpoint the user of the telephone be capable of originating a call without touching it when operating the vehicle.

A conventional voice recognition dialing unit includes a voice inputting section on which the caller, i.e., the user of the telephone may enter a command by voice. A voice characteristics extracting section extracts the characteristics of voice entered on the inputting section. A registered voice recording section registers and records the user's voice as voice patterns. A subscriber storing section stores in one-to-one correspondence the telephone numbers and names of subscribers with whom the user may communicate. A recognizing section recognizes an entered voice command by comparing the input voice with the voice characteristics registered in the registered voice recording section. A processing section executes a call origination processing in response to the recognized voice command and according to a preprogrammed procedure for call origination. Key switches are operable to input digital data to the processing section. A call originating section reads, in response to a call origination instruction fed thereto from the processing section, the dial number of the corresponding subscriber and thereby controls the generation of dial pulses. A dial pulse generating section outputs dial pulses to a communication line. A registered response storing section is loaded with predetermined response information for responding on the basis of an instruction from the processing section. An indicating section indicates response information.

It has been customary with the above-stated processing section to execute call originating operations and verifications thereby by an interactive procedure between the user and the processing section. A specific interactive procedure will be described hereinafter.

To begin with, the user of the telephone voices a recall command "RECALL MEMORY". The voice entered on the voice inputting section is recognized as a recall command by the voice recognizing function assigned to the voice characteristics extracting section, registered voice storing section, and recognizing section. The recognized recall command is fed from the recognizing section to the processing section which in turn applies it to the registered response storing section. In response, the registered response storing section delivers, for example, response information "NAME, PLEASE" stored beforehand in the indicating section, causing the indicating section to indicate it. Then, the user voices a desired name registered in the subscriber storing section as a command word. Again, the previously mentioned voice recognizing function recognizes the name as a command word. Then, the indicating section produces a sound such as "PIP" as a response. This is followed by either one of two different procedures, i.e., a procedure A wherein a dialing operation is executed immediately and a procedure B wherein the user verifies the desired subscriber's telephone number.

In the procedure A, as the user enters a voice command "SEND", for example, the processing section operates the call origination control section and dial signal generating section to output a calling signal to the telephone line. At the same time, the indicating section indicates a particular word registered in the registered response storing section such as "DIALING".

In the procedure B, as the user voices "VERIFY", the indicating section indicates the registered telephone number. Then, a call is originated in the same manner as in the procedure A. If the indicated telephone number is wrong as determined by the verifying step, the user enters a voice command such as "CLEAR" so as to return the program to the initial step.

The problem with the above specific procedure is that when some of the names stored in the registered voice recording section have similar patterns, the word representative of the right name is not always the first-place result of recognition. When a word representative of a name similar to the desired one is indicated, the call originating operation has to be terminated midway. Therefore, the dialing unit implemented by such a call origination procedure not only suffers from low recognition rate but also forces the user to start the call originating operation over again.

Another approach available in the art for the verification of the desired subscriber is the key switches which the user may manipulate to cause a plurality of names having similar voice patterns to be indicated. However, operating the key switches while driving the vehicle is not desirable from the safety standpoint, as discussed earlier.

The response for the verification of the subscriber has heretofore been implemented as a telephone number, as stated previously. It rarely occurs, however, that the user memorizes every one of the subscriber numbers or similar telephone numbers assigned to remote stations. Since the user enters the subscriber's names and the associated telephone numbers with care, it will suffice to produce a voice response representative of only the name for verification. It follows that the names may be stored in a memory built in the addressee recording section as synthetic voice data in the event when they are registered together with the associated telephone numbers. This, however, would result in the need for an extra memory capacity for synthesizing the names. This, coupled with the fact that the stored data have to be held semipermanently, renders the address management and data storage of the address storing section complicated and, therefore, expensive.

SUMMARY OF THE INVENTION

It is therefore an object of the present invention to provide a voice recognition dialing unit which allows a call to be originated with ease.

It is another object of the present invention to provide a voice recognition dialing unit provided with means for voicing the name of a desired subscriber for verification.

In accordance with the present invention, a voice recognition dialing unit comprises a storing section for registering in one-to-one correspondence names and telephone numbers of subscribers with whom the dialing unit may communicate, a voice recognizing section for recognizing a voice which is inputted by a calling person, an indicating section for indicating predetermined response information for responding to the calling person, a call originating dial generating section for generating a dial signal associated with a subscriber who is recognized by the voice recognizing section, a processing section for executing a call origination procedure among the voice recognizing section, storing section, indicating section, and call originating dial generating section. The processing section has a call origination procedure for causing, in response to a predetermined command, the indicating section to indicate names of a plurality of candidates to be called which are registered in the storing section.

BRIEF DESCRIPTION OF THE DRAWINGS

The above-mentioned and other objects, features and advantages of the present invention will become more apparent by reference to the following detailed description of the invention taken in conjunction with the accompanying drawings, wherein.

DETAILED DESCRIPTION OF THE PREFERRED EMBODIMENTS

Figure 1:
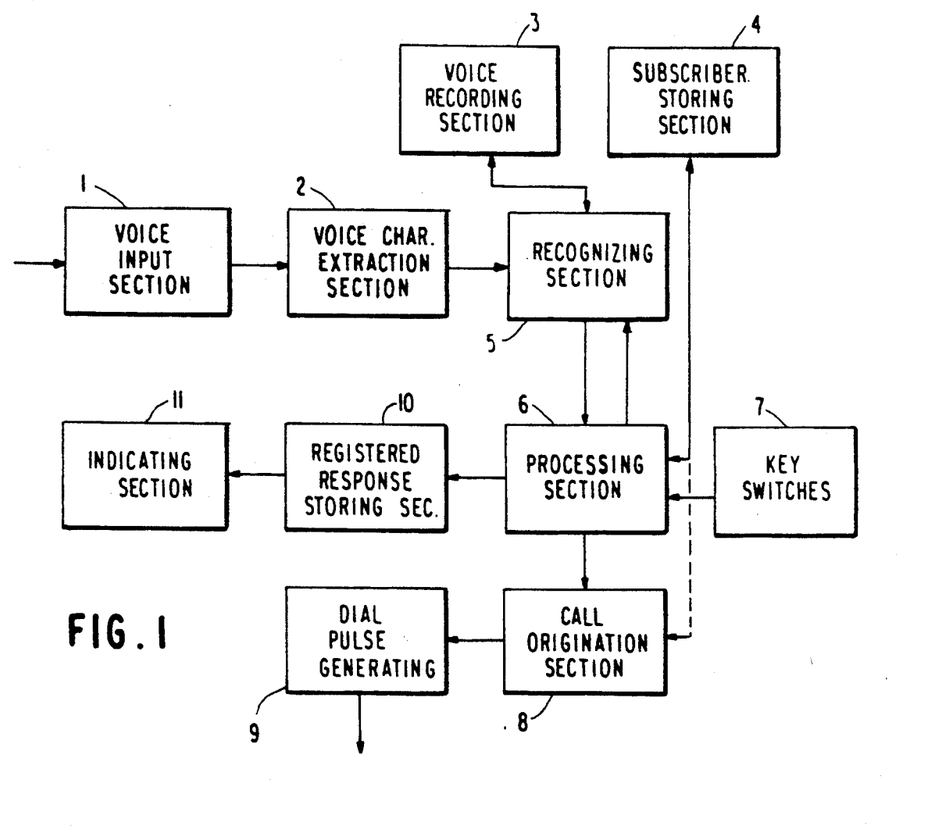
FIG. 1 is a block diagram schematically showing a voice recognition dialing unit embodying the present invention.

Referring to FIG. 1 of the drawings, a voice recognition dialing unit embodying the present invention is shown and includes a voice inputting section 1 on which the user of the telephone may enter a command by voice. A voice characteristics extracting section 2 extracts the characteristics of a voice which is entered on the voice inputting section 1. A registered voice recording section 3 registers and records the user's voice in the form of voice patterns. A subscriber storing section 4 stores the telephone numbers and names of registered subscribers with whom the user may communicate. A recognizing section 5 compares the input voice with the voice characteristics registered in the voice recording section 3 and thereby recognizes a voice command. A processing section 6 executes call origination processing in response to a voice command recognized by the recognizing section 5 and according to a procedure which is loaded beforehand as a call origination program. Key switches 7 are operable to enter digital data into the processing section 6. A call originating section 8 reads out, in response to a call origination instruction from the processing section 6, the dial number of the designated subscriber and controls the generation of dial pulses. A dial pulse generating section 9 delivers a calling signal to a telephone line which may be connected to a telephone exchange over a radio frequency or through a wired line. A registered response storing section 10 stores predetermined response information for answering a command from the processing section 6. An indicating section 11 indicates the response information by delivering the information through a loudspeaker and/or displaying the information on a display panel.

Figure 2:
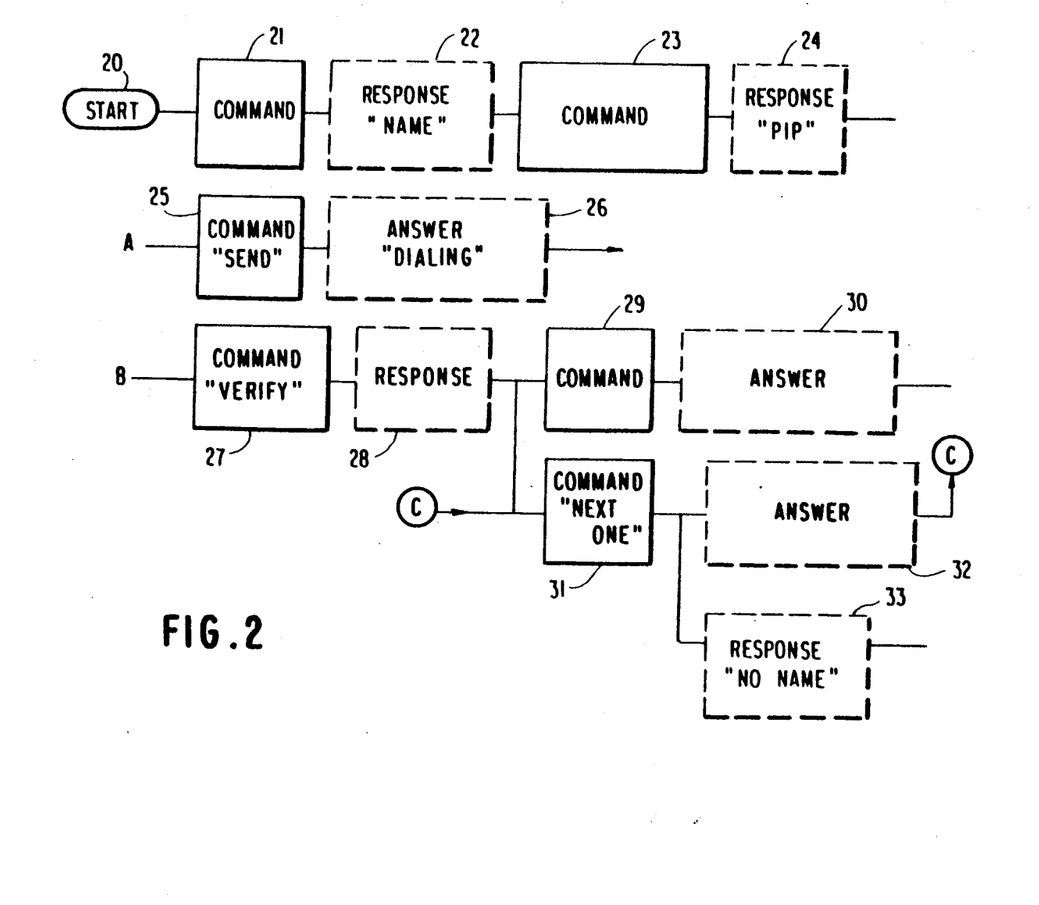
FIG. 2 is a flowchart representative of a call origination procedure executed by the illustrative embodiment.

Specifically, as shown in FIG. 2 with reference to FIG. 1, the call origination procedure of the illustrative embodiment begins with start 20 for starting up the unit. In FIG. 2, it is to be noted that solid frames are representative of voice commands entered by the user, and phantom frames are representative of response information indicated by the indicating section 11. First, the user voices a recall command "RECALL MEMORY" to enter it on the voice inputting section 1. The resulted voice signal is recognized as a recall command by the voice recognizing function which is assigned to the voice characteristics extracting section 2, registered voice recording section 3, and recognizing section 5. As the recall command is fed from the recognizing section 5 to the processing section 6, the processing section 6 feeds the recall command to the registered response storing section 10 together with a response instruction. In response, the registered response storing section 10 commands the indicating section 11 to indicate the response 22 which is associated with the recall command and stored beforehand, e.g. "NAME, PLEASE". Then, the indicating section 11 indicates the response information by voice. Next, the user enters command 23 in the form of a command word which is representative of the name registered in the subscriber storing section 4. Again, the name of the command word is recognized by the voice recognizing function. This is followed by response 24 which is an answer tone such as "PIP" and produced by the indicating section 11. Then, the user may select either one of two different procedures, i.e., a procedure A which immediately starts a dialing operation and a procedure B which allows the user to verify the other party's telephone number.

In the procedure A, the user voices "SEND", for example, as command 25. In response, the processing section 6 causes the call originating section 8 and dial pulse generating section 9 to perform call originating operations with the result that a calling signal is sent out to the communication line. At the same time, the processing section 6 causes the indicating section 11 to indicate particular information registered in the registered response storing section 10, e.g. "DIALING" as represented by answer 26.

On the other hand, in the procedure B, the user speaks the word "VERIFY" to enter it on the voice inputting section command 27 so that the indicating section 11 indicates the remote station's telephone number registered in the subscriber storing section 4 by response 28. The command 29 and answer 30 are the same as in the procedure A.

Assume that the telephone number voiced by the indicating section 11 as response 28 in response to the command 23 is different from the expected name, i.e., the recognizing section 5 has misrecognized the entered name. Then, the illustrative embodiment makes it needless for the user to start the call originating operation over again. Specifically, the user can call up a lower candidate by entering a voice command "NEXT ONE" on the voice inputting section as command 31. When the recognizing section 5 has recognized a plurality of candidates in response to the command 31, the indicating section 11 voices the telephone number associated with the lower candidate. If even the second candidate is not the desired one, the command 31 is entered again to cause the indicating section 11 to show the user the succeeding candidate's telephone number. When the recognizing section 5 finds no candidates or runs out of the candidates, it indicates "NO NAME" as response 33. Thereafter, the program returns to the initial step, i.e. start 20.

As stated above, when the name of the first-place candidate recognized by the recognizing section 5 is different from the desired name, the user can call up the telephone number associated with the name of the lower-place candidate by entering a particular command. This is successful in reducing the recognition error rate even when a name or word having a voice pattern similar to those of the names stored in the registered voice storing section 3 is entered. Moreover, the user does not have to start the call originating operation over again, so that a call can be originated efficiently.

Figure 3:
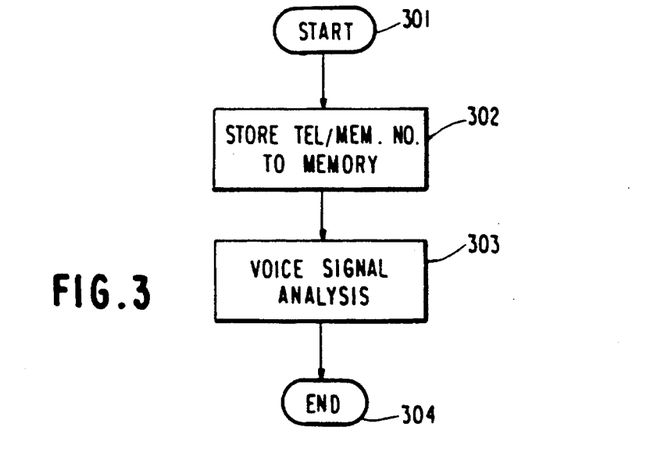
FIG. 3 is a flowchart representative of a specific operation of a processing section for registering the names and associated telephone numbers in a registered voice storing section and an addressee storing section particular to the illustrative embodiment.

Referring to FIG. 3, how the subscribers with which the telephone may communicate are registered by the user will be described. As the user operates the key switches 7 to apply a register command to the processing section 6, the processing section 6 starts on a procedure for registering the telephone numbers and names of the subscribers (step 301). Then, the user inputs a subscriber's telephone number and then a store command on the key switches 7 to the processing section 6. Further, the user inputs a memory number associated with, for example, speed calling corresponding to the subscriber's telephone number and then a store command on the key switches 7. In response, the processing section 6 writes the telephone number and memory number into a memory which is incorporated in the subscriber storing section 4 and associated with the subscriber (step 302). Subsequently, the user enters a name by voice on the voice inputting section 1. The resulted voice signal is applied to the voice characteristics extracting section 2 with the result that the voice characteristics are formed in a pattern which is expressed by time and frequency. The extracted voice pattern is fed to the recognizing section 5. The processing section 6 causes the recognizing section 5 to write the extracted voice pattern into the memory of the registered voice storing section 3 which is associated with the above-mentioned memory number (step 303). This completes the sequence of steps for registering the telephone number and name of one subscriber. Thereafter, the user may repeat the steps 301 to 304, the number of times corresponding to the number of desired subscribers.

Figure 4A:
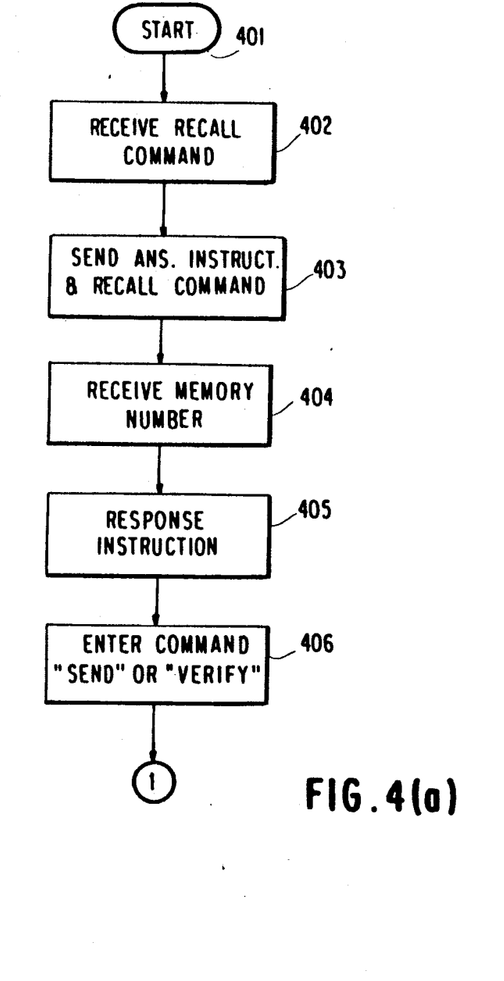
FIGS. 4(a) and 4(b) are flowcharts demonstrating a specific operation of the processing section for originating a call in the illustrative embodiment.
Figure 4B:
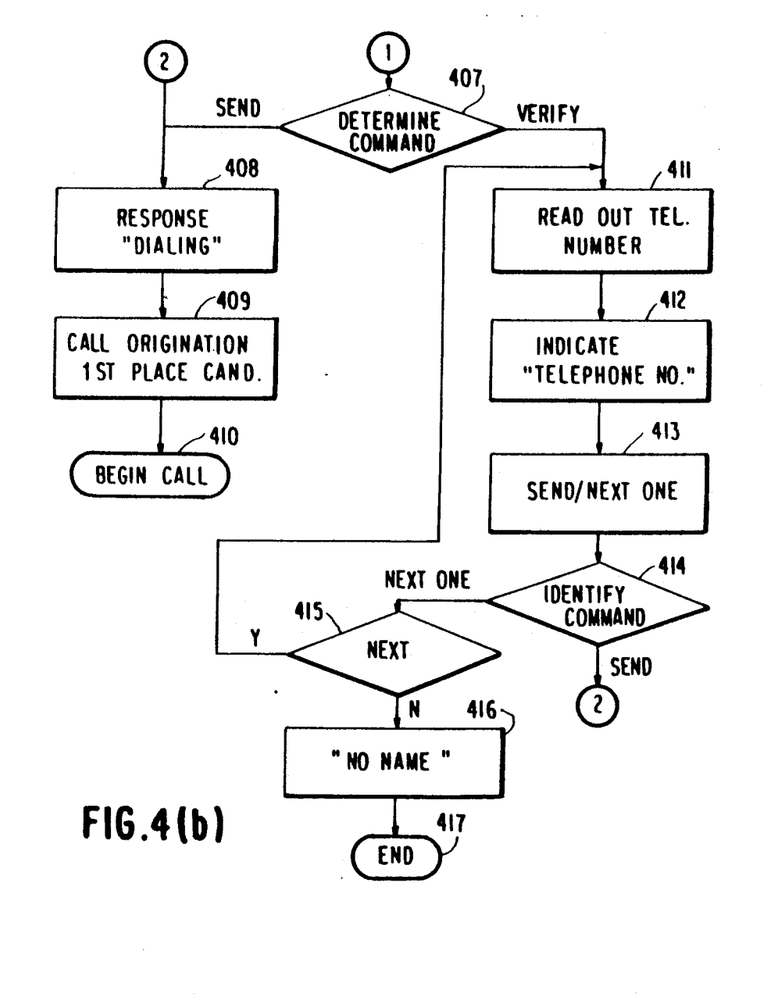

Referring to FIGS. 4(a) and 4(b), the dialing unit is fully prepared for call origination when it is started up (step 401).

First, the user voices a command "RECALL MEMORY" to enter it on the voice inputting section 1. The recognizing section 5 compares the characteristics of the entered voice with the characteristics registered in the registered voice storing section 3 beforehand and thereby recognizes the input voice as a recall command. The recall command is fed from the recognizing section 5 to the processing section 6. On receiving the recall command (step 402), the processing section 6 delivers the recall command and an answer instruction to the registered response storing section 10 (step 403). Then, the storing section 10 feeds response information "NAME, PLEASE" associated with the recall command to the indicating section 11 and thereby causes it to voice the response information.

On receiving the response information, the user enters the name of the desired subscriber on the voice inputting section 1. The recognizing section 5 recognizes the inputted name and feeds a memory number associated with the entered name to the processing section 6. The memory number is associated with the telephone number or the name stored in the subscriber storing section 4, as stated earlier. While the recognizing section 5 selects names which resemble the voice characteristics of the entered name, a plurality of memory numbers associated with those names are applied to the processing section 6. For example, the first-place to third-place candidates stored in the registered voice storing section 3 are selected. On receiving the memory numbers (step 404), the processing section 6 feeds the memory number assigned to the first candidate to the registered response storing section 10 together with a response instruction (step 405). In response to the memory number and response instruction, the storing section 10 delivers associated response information "PIP" to the indicating section 11 to cause the latter to indicate the response information.

On receiving the answer "PIP", the user enters a voice command "SEND" or "VERIFY" on the voice inputting section 1. In response, the recognizing section 5 feeds the command "SEND" or "VERIFY" to the processing section 6. On receiving the command (step 406), the processing section 6 determines whether the command is "SEND" or "VERIFY" (step 407).

If the voice command is "SEND", then the processing section 6 delivers the command "SEND" and a response instruction to the registered response storing section 10. The storing section 10 instructs the indicating section 11 to produce a response "DIALING" (step 408), whereby the indicating section 11 voices this response information. On completion of the indication, the processing section 6 instructs the call originating section 8, the delivery of the memory number of the first-place candidate received in the step 404 and the origination of a call (step 409). In response to the instruction, the call originating section 8 reads a telephone number associated with the received memory number out of the subscriber storing section 4 and feeds the telephone number of the dial pulse generating section 9. After the dial pulse generating section 9 has sent out a dial signal to the telephone line, the processing section 6 ends the call originating procedure (step 410).

On the other hand, if the voice command arriving at the processing section 6 is "VERIFY", the processing section 6 reads the associated telephone number out of the subscriber storing section 4 on the basis of the memory number of the first-order candidate having been received (step 411). The processing section 6 feeds the telephone number read out and a response instruction to the registered response storing section 10 (step 412), while the storing section 10 instructs the indicating section 11 to indicate "TELEPHONE NUMBER". As a result, the indicating section 11 indicates the telephone number by voice.

By hearing the telephone number voiced by the indicating section 11, the user determines whether to dial or to see the telephone number of the second-place candidate. If the indicated telephone number is the desired one, the user enters a voice command "SEND" while, if it is not the desired one, the user enters a voice command "NEXT ONE". The recognizing section 5 identifies the command entered on the voice inputting section 1 and delivers a corresponding instruction to the processing section 6. On receiving this instruction (step 413), the processing section 6 identifies it (step 414) and, if it is representative of "SEND", executes the step 408.

If the command is "NEXT ONE", then the processing section 6 determines whether or not the memory number of the next candidate exists (step 415). If the answer of the step 415 is YES, the program returns to the step 411. If the answer of the step 415 is NO, the processing section 6 delivers a command for indicating "NO NAME" and a response instruction to the registered response storing section 10 (step 416). Then, the call origination procedure is terminated (step 417), and the processing section 6 is restored to the stand-by state which precedes the step 401.

It is to be noted that the operations of the processing section 5 and recognizing section 4 may be implemented by an integrated circuit θPD702161 manufactured and marketed by NEC.

Figure 5:
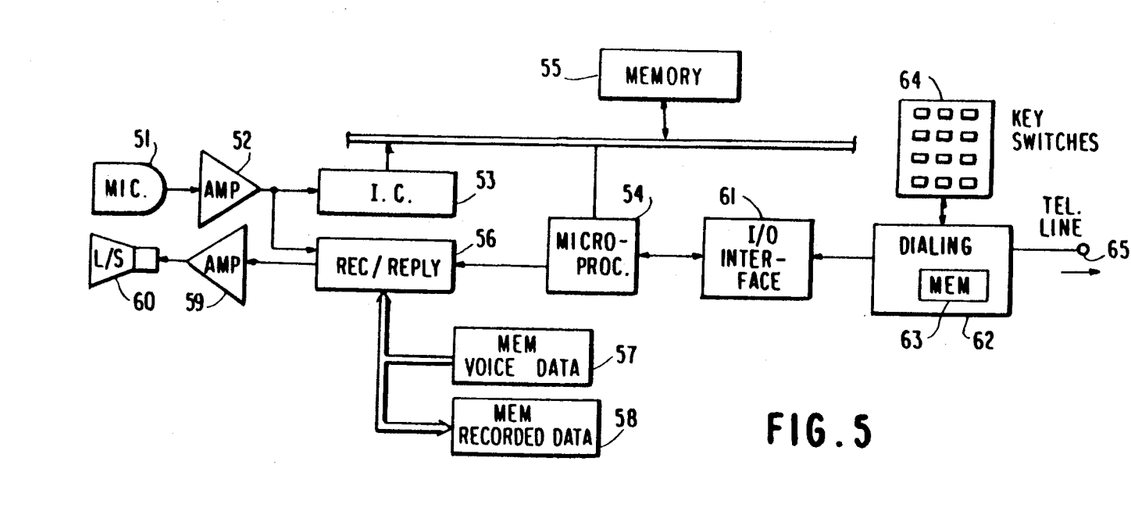
FIG. 5 is a block diagram schematically showing an alternative embodiment of the present invention.

Referring to FIG. 5, an alternative embodiment of the present invention will be described. As shown, the alternative embodiment includes a microphone 51 for entering the user's voice, an amplifier 52 for amplifying the entered voice signal, a voice analyzing integrated circuit (IC) 53 for analyzing the characteristics of the voice signal outputted by the amplifier 52, a microprocessor 54, a registered pattern memory 55 storing voice characteristics, a recording/reproducing IC 56 for recording the voice signal outputted by the amplifier 52 and executing voice response processing, a response voice data memory 57 and a recorded data memory 58 which are connected to the recording/reproducing IC 56, an amplifier 59 for amplifying the voice sitnal outputted by the recording/reproducing IC 56, and a loudspeaker 60 for outputting the voice signal as a voiced response. A dialing device 62 is connected to the microprocessor 54 via an input/output (I/O) interface 61. A memory 63 is built in the dialing device 62. Key switches 64 are connected to the dialing device 62 for inputting digital data. A calling signal or dial pulses are fed out from the dialing device 62 to the telephone line 65. The voice analyzing IC 53 and registered pattern memory 55 are connected to the microprocessor 54 by a bus line.

User's voice is entered on the microphone 51, amplified by the amplifier 52, and then applied to the voice analyzing IC 53. When the procedure under way is the subscriber registering procedure, the voice characteristics produced by the voice analyzing IC 53 are written into the registered pattern memory 55 together with the memory number associated with the subscriber by the microprocessor 54. The memory 55 may be implemented as an S-RAM or similar memory device. At this time, the microprocessor 54 registers the name and telephone number of the subscriber in the memory 63 of the dialing device 62 via the I/O interface 61 while associating them with the memory number. The memory number may also be applied as a speed call number to the microprocessor 54 by the key switches or dialing means 64. As stated above, the speed call number (memory number), name and telephone number are associated with one another. For example, "speed call number 55 (memory number 55)", "NEC" and "03-544-1111" are associated with one another.

In this particular embodiment, while the user is performing a call originating operation, the recording/reproducing IC 56 is held in a recording state so as to continuously record the voice being entered on the microphone 51. The data being so recorded are sequentially written into the recorded data memory 58 which is implemented as a D-RAM or similar memory device and has a capacity accommodating one of the names stored in the registered pattern memory 55.

Figure 6:
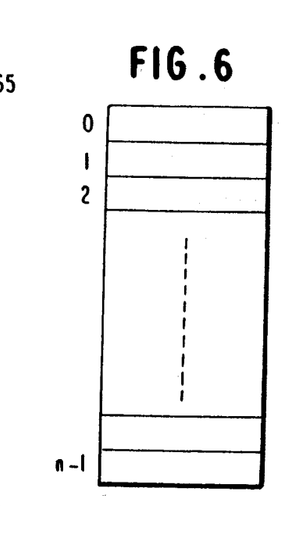
FIG. 6 is a memory map representative of a recorded data memory included in the embodiment shown in FIG. 5.

As FIG. 6 indicates, the recorded data memory 58 has a capacity of n bytes, i.e., byte 0 to byte (n−1) each of which is capable of storing recorded data representative of a single subscriber's name. The recorded data are sequentially written into the memory 58 from the byte 0 to the byte (n−1) and then to the byte 0 again. In this manner, the recorded data are written into the recorded data memory 58 cyclically.

The microprocessor 54 causes the recording/reproducing IC 56 to stop recording when it has recognized the subscriber's "name" in response to the entered voice signal. Assuming that, among the recorded data, the last sampling data has been written in the eleventh byte or byte 10 of the recorded data memory 58, and that the "name" needs the maximum memory capacity, the name will have been written in all of the n bytes cylically from the byte 11 to the byte 10. When the capacity needed to register the "name" is smaller than n bytes, needless data other than the "name" stored in the recorded data memory 58 can be deleted by the function of detecting the beginning of a "name" particular to the microprocessor 54. Hence, if the n bytes of the memory 58 as counted from the byte 11 are reproduced, the "name" entered by the user can be used as a voice response, as will be described.

Consider the memory number discussed previously by way of example. In the illustrative embodiment, when the user enters the subscriber's name "NEC" on the microphone 51, the name "NEC" is recorded in the memory 58 and a response voice stored in the response voice data memory 57 beforehand in association with the memory number and the recorded data are combined to generate response information. The memory 57 is constituted by a ROM or similar memory device. For example, as the recording/reproducing IC 56 receives the memory number and a name response instruction from the microprocessor 54, it reads "NEC" out of the recorded data memory 58 and "CALLING" out of the response information associated with the memory number, combines them, and then produces a message "CALLING NEC" via the amplifier 59 and loudspeaker 60.

As stated above, the user verifies the subscriber's name by hearing the answer which is the voice entered by the user himself or herself and, therefore, sounds natural. This embodiment is simple in construction because the required capacity of the memory for storing recorded data is not more than a single name.

Figures 7A, 7B:
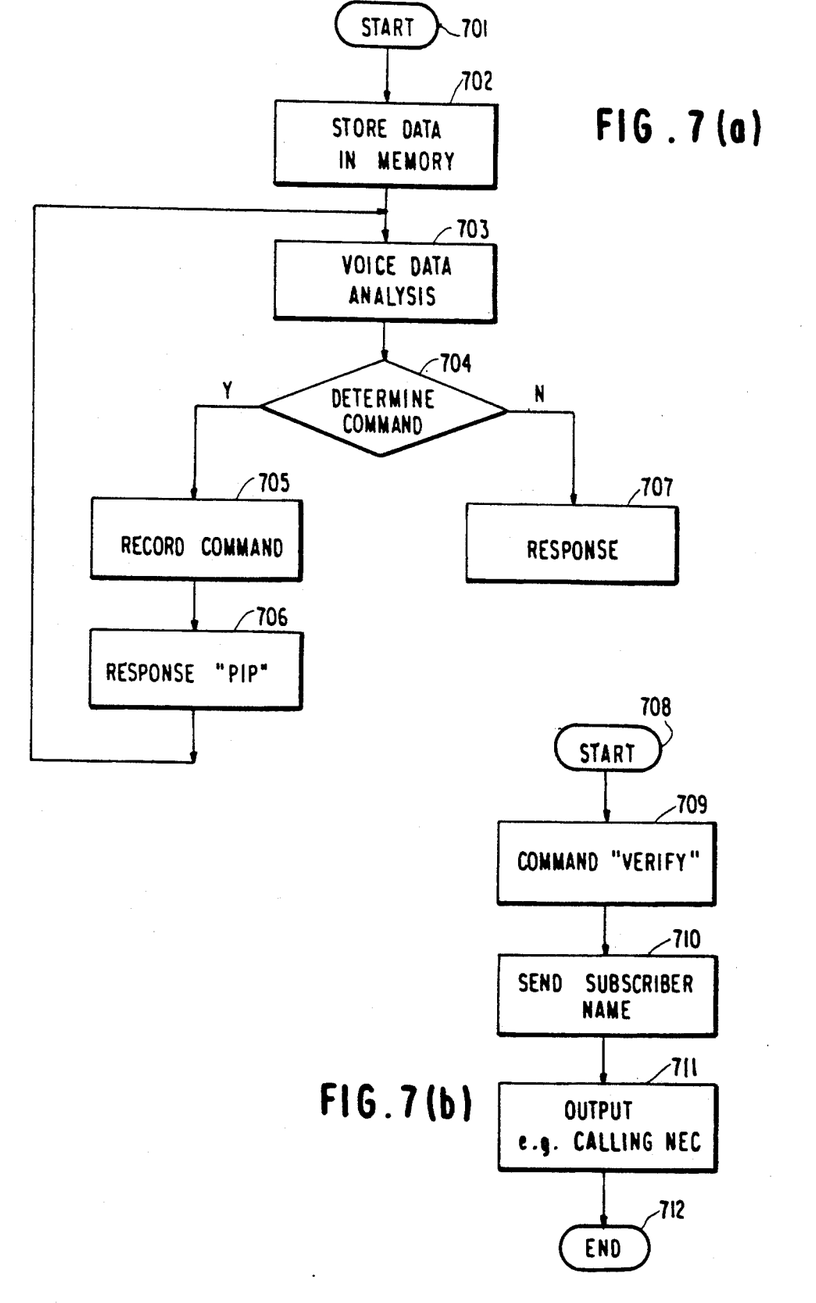
FIGS. 7(a) and 7(b) are flowcharts showing a specific operation of the processing section of FIG. 5 which is related to the verification of the other party's name.

Referring to FIG. 7(a), there is shown a flowchart representative of the command 23 and response 24 of FIG. 2 specifically. The call origination procedure begins when the dialing unit is started up (step 701). The microprocessor 54 delivers to the recording/reproducing IC 56 an instruction for recording a voice signal to be inputted on the microphone 51 and via the amplifier 52 and an instruction for writing the recorded data into the recorded data memory 58 (step 702). In this condition, the microprocessor 54 awaits the entry of a voice command on the microphone 51. As the user enters a voice command on the microphone 51, the voice analyzing IC 53 extracts the characteristics of the entered voice. The result of voice analysis is applied to the microprocessor 54. On receiving the voice analysis data, the microprocessor 54 performs voice recognizing operations including the detection of the beginning and end of the voice command and the comparison of the voice analysis data with the registered patterns of voice characteristics stored in the registered pattern memory 55 beforehand (step 703). As the comparison completes, the microprocessor 54 receives a command or a memory number associated with the voice command from the register pattern memory 55 to see if the voice command is a subscriber's name command or any other command (step 704). If the voice command is a subscriber's name command as determined in the step 704, the microprocessor 54 delivers a record stop instruction (step 705). At this time, a single subscriber's name has been written into the recorded data memory 58. Thereafter, the microprocessor 54 produces a response "PIP" (step 706) and then returns to the step 703. When the entered voice command is not a subscriber's name command, the microprocessor 54 instructs a response as indicated by the voice command (step 707).

FIG. 7(b) is a flowchart showing the step 28, i.e., "VOICE TELEPHONE NUMBER" specifically. In this particular embodiment, the response is produced as a name. After the step 706 of FIG. 7(a), the user enters a voice command "VERIFY" on the microphone 51, causing the dialing unit to start on a subscriber name responding procedure (step 708). Specifically, as the microprocessor 54 receives a command "VERIFY" (step 709), the microprocessor 54 delivers a memory number associated with the subscriber's name and a response instruction to the recording/reproducing IC 56 (step 710) to thereby instruct the latter to voice the subscriber's name. In response, the IC 54 reads the name such as "NEC" out of the recorded data memory 58 and "CALLING" out of the response voice data memory 57, combines them, and then applies response information "CALLING NEC" to the amplifier 59. Such a message is outputted from the loudspeaker 60. As soon as the message is fully outputted from the loudspeaker 60, the recording/reproducing IC 56 sends an end-of-response signal to the microprocessor 54. On receiving the end-of-response signal (step 711), the microprocessor 54 terminates the procedure (step 712).

Figure 8:
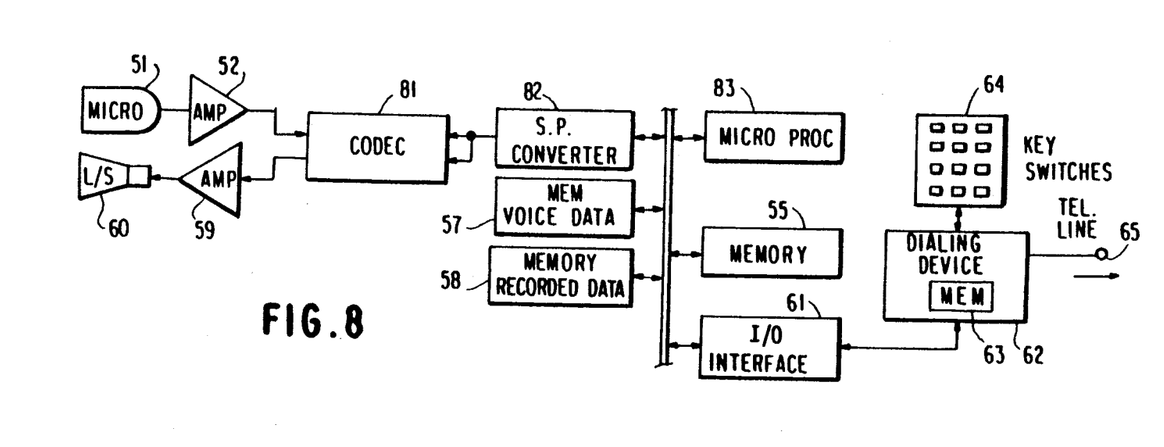
FIG. 8 is a block diagram schematically showing another alternative embodiment of the present invention.

Referring to FIG. 8, another alternative embodiment of the present invention will be described. As shown, voice signal-to-PCM (Pulse Code Modulation) signal converting means 81 is provided between the voice input and output circuits of FIG. 5 which include the microphone 51, amplifiers 52 and 59 and loudspeaker 60 and the voice data processing circuit which is constituted by the other components of FIG. 5.

In FIG. 8, a voice signal from the microphone 51 is applied to the PCM codec 81 via the amplifier 52. The codec 81 converts the voice signal into a serial PCM signal. A serial-to-parallel (SP) converter 82 transforms the serial PCM signal into a parallel signal. The voice PCM signal is fed to a microprocessor 83 by a bus line. The microprocessor 83 is connected to the register pattern memory 55, response voice data memory 57, recorded data memory 58, and the I/O interface 61 by the bus line. The I/O interface 61 is connected to the dialing device 62. Again, the memory 63 mentioned with reference to FIG. 5 is built in the dialing device 65. The key switches 64 and telephone line 65 are connected to the memory 63. A PCM voice response signal applied from the SP converter 82 to the PCM codec 81 is also transformed from a PCM signal into a voice signal and then outputted via the amplifier 59 and loudspeaker 60.

The functions of the voice analyzing IC 53 and recording/reproducing IC 56 are assigned to the microprocessor 83. Regarding the call originating and voice responding operations, the microprocessor 83 serves the functions of the microprocessor 54, voice analyzing IC 53, and recording/reproducing IC 56 shown in FIG. 5 The call origination procedure and the voice response are the same as in the embodiment of FIG. 5 and, therefore, will not be described to avoid redundancy.

What is claimed is:

1. A voice recognition dialing unit comprising:
   storing means for registering, in on-to-one correspondence, names and telephone numbers of subscribers with whom said dialing unit may communicate;
   voice recognizing means for recognizing a voice which is inputted by a calling person;
   indicating means for indicating predetermined response information for responding to the calling person;
   call originating dial generating means for generating a dial signal associated with a subscriber who is recognized by said voice recognizing means; and
   processing means for executing a call origination procedure by controlling said voice recognizing means, said storing means, said indicating means, and said call originating dial generating means;
   said processing means being operatively connected to said storing means and said voice recognizing means so as to effect a call origination procedure for causing, in response to each of a plurality of utterances of a predetermined voice command uttered by the calling person, said indicating means to respectively, sequentially make an indication of a next one of a plurality of candidates to be called which are registered in said storing means, said voice command being independent of said names registered in said storing means.

2. A unit as claimed in claim 1, wherein said processing means causes, in response to said utterances of said voice command, said indicating means to sequentially indicate the telephone numbers of said plurality of candidates.

3. A voice recognition dialing unit comprising:
   a voice inputting section for inputting a voice of a calling person;
   a voice characteristics extracting section of extracting voice characteristics of said voice entered on said voice inputting section;
   a registered voice recording section in which voice characteristics of the calling person are registered and recorded beforehand;
   a storing section for storing telephone numbers of subscribers registered in said registered voice recording section together with names associated one-to-one with said telephone numbers;
   a recognizing section for recognizing said voice as a voice command by comparing said voice with the voice characteristics registered in said registered voice recording section;
   a processing section for executing, in response to said voice command, call origination processing according to a call origination procedure which is loaded as a call origination program beforehand;

a call originating section for reading a dial number of an associated subscriber in response to a call origination instruction from said processing section;

a dial pulse generating section for generating a calling signal in response to an instruction from said call origination section;

a registered response storing for storing predetermined response information; and an indicating section for indicating the response information;

said processing section having a call origination procedure for allowing, when the calling person determines that a result of an indicating produced by said indicating section is different from the voice command, the calling person to enter a plurality of utterances of a particular voice command which each cause said indicating section to respectively, sequentially indicate a next one of a plurality of candidates to be called registered in said storing section, said voice command being independent of said names stored in said storing section.

4. A unit as claimed in claim 3, wherein said processing section causes, in response to said utterances of said voice command, said indicating section to sequentially indicate the telephone numbers of said plurality of candidates.

* * * * *

UNITED STATES PATENT AND TRADEMARK OFFICE
CERTIFICATE OF CORRECTION

PATENT NO. : 5,222,121
DATED : June 22, 1993
INVENTOR(S) : Keiko Shimada

It is certified that error appears in the above-indentified patent and that said Letters Patent is hereby corrected as shown below:

Col. 7, line 24, delete "$\theta$", insert --$\mu$--.

Col. 7, line 39, delete "situal", insert --signal--.

Signed and Sealed this

Fifth Day of July, 1994

Attest:

BRUCE LEHMAN

Attesting Officer    Commissioner of Patents and Trademarks